United States Patent
Zhang et al.

(10) Patent No.: US 8,621,551 B2
(45) Date of Patent: Dec. 31, 2013

(54) SAFETY AND MANAGEMENT OF COMPUTING ENVIRONMENTS THAT MAY SUPPORT UNSAFE COMPONENTS

(75) Inventors: Xinwen Zhang, San Jose, CA (US); Liang Xie, State College, PA (US); Jean-Pierre Seifert, San Jose, CA (US); Onur Aciicmez, San Jose, CA (US); Afshin Latifi, San Jose, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 1418 days.

(21) Appl. No.: 12/106,235

(22) Filed: Apr. 18, 2008

(65) Prior Publication Data

US 2009/0265756 A1 Oct. 22, 2009

(51) Int. Cl.
*G06F 21/00* (2013.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | | |
|---|---|---|---|---|
| 2007/0110244 | A1* | 5/2007 | Sood et al. | 380/270 |
| 2008/0187023 | A1* | 8/2008 | Jankowski et al. | 374/152 |
| 2008/0244257 | A1* | 10/2008 | Vaid et al. | 713/2 |
| 2010/0017879 | A1* | 1/2010 | Kuegler et al. | 726/23 |

OTHER PUBLICATIONS

"Out-of-band management" —Wikipedia, the free encyclopedia, http://wikipedia.org/wiki/Out-of-band_management.
"Intel Active Management Technology" —Wikipedia, the free encyclopedia, http://wikipedia.org/wiki/Intel_Active_Management_Technology.
Caceres et al., "Trusted Mobile Computing," Proc. of IFIP Workshop on security and Privacy in Mobile and Wireless Networks, May 2006.
M. Costa et al., "Vigilante: End-to-end containment of internet worms," In Proceedings of the 20$^{th}$ ACM Symposium on Operating systems Principles (SOSP'05), Oct. 2005.

(Continued)

*Primary Examiner* — William Goodchild
(74) *Attorney, Agent, or Firm* — Kenneth L. Sherman, Esq.; Michael Zarrabian, Esq.; Sherman & Zarrabian LLP (57) ABSTRACT

Techniques for managing and protecting computing environments are disclosed. A safe computing environment can be provided for ensuring the safety and/or management of a device. The safe computing environment can be secured by a safe component that isolates and protects it from unsafe computing environments which may also be operating. As a result, various security and management activities can be securely performed from a safe computing environment. A safe computing environment can, for example, be provided on a device as a safe virtual computing environment (e.g., a safe virtual machine) protected by a safe virtual computing monitor (e.g., a safe virtual machine monitor) from one or more other virtual computing environments that are not known or not believed to be safe for the device. It will also be appreciated that the safe components can, for example, be provided as trusted components for a device. As such, various trusted components (or agent) can operate in a trusted computing environment secured from interference by components that many not be trusted and perform various security and/or management tasks alone or in connection, for example, with other trusted components (e.g., trusted serves).

24 Claims, 7 Drawing Sheets

(56) References Cited

OTHER PUBLICATIONS

Newsome et al., "Dynamic Taint analysis for Automatic Detection, Analysis, and Signature Generation of Exploits on Commodity Software," In Proceedings of the 12th Annual Network and Distributed System Security Symposium, 2005.

Suh et al., "Secure Program Execution via Dynamic Information Flow Tracking," In Proceedings of the 11th International Conference on Architectural Support for Programming Languages and Operating Systems (ASPLOS'04), Oct. 2004.

"OMTP Device Management Enabler Requirements," OMTP Device Management Enabler Version 1_0, OMTP Ltd., 2006.

U.S. Appl. No. 12/025,678, filed Feb. 4, 2008.

* cited by examiner

SAFETY AND MANAGEMENT OF COMPUTING ENVIRONMENTS THAT MAY SUPPORT UNSAFE COMPONENTS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices, is evidenced by their ever increasing use in everyday life. Accordingly, improved techniques for managing computing devices would be useful. In particular, improved techniques suitable for managing mobile communication devices would be very useful.

SUMMARY OF THE INVENTION

Broadly speaking, the invention relates to computing systems. More particularly, the invention provides improved techniques for managing and protecting computing environments. It will be appreciated that the invention provides techniques that are especially useful for mobile computing environments.

In accordance with one aspect of the invention, a computing environment known or believed to be safe can be provided as a "safe computing environment" for ensuring the safety of a device and/or management of the device. It will be appreciated that a safe computing environment can be provided in a secure manner such that it cannot be adversely affected by one or more other computing environments that are not known or not believed to be safe ("unsafe computing environment"). As a result, various security and management activities can be securely performed from a safe computing environment to ensure the safety of a device and/or safely perform various management activities for a device despite the unsafe computing environments that may be supported by the device. In accordance with one embodiment of the invention, an isolating/guarding component can be initiated for a device as a safe component after its safety has been verified. The safe isolating/guarding component can effectively isolate and/or guard a safe computing environment operating on the device from one or more unsafe computing environments which may also operate on the device. It will be appreciated that the safety of the safe computing environment can also be verified before initiating it as a safe component. In a similar manner, the safety of one or more executable computing components (e.g., applications, tasks, services) can be verified before allowing them to be initiated as one or more safe components in the safe computing environment. The one or more safe components in the safe computing environment can be effectively isolated from the unsafe computing environment(s) and guarded (or protected) by the safe isolating/guarding component against any adverse interference from the unsafe computing environment(s). Yet, the one or more safe components are able to effectively access and/or monitor the unsafe computing environment(s) via the safe isolating/guarding component, thereby allowing the one or more safe components to securely monitor the unsafe computing environment(s) and/or perform various management operations in order to manage the unsafe computing environment(s) in a secure manner by performing various management operations. It will be appreciated that these management operations can, for example, include: monitoring the unsafe computing environment(s) to detect unauthorized use, removing and/or correcting computer program code deemed to be corrupted, and so on. More generally, various management activities including security enforcement, providing updates and/or configuration services, can be performed by one or more safe components which can act alone and/or in collaboration, for example, with one or more safe external sources (e.g., a trusted security sever, a trusted configuration server) to effectively ensure the safety of a device and manage it safely.

In accordance with another aspect of the invention, virtualization techniques can be utilized to provide a safe virtual computing environment in order to ensure the safety of a device and/or manage one or more other virtual computing environments representing unsafe computing environments that may also be operating on the device. In one embodiment, a safe virtual environment monitor (e.g., a virtual machine monitor) effectively isolates and protects a first virtual computing environment (e.g., a first virtual machine) which serves as a safe virtual computing environment from one or more other virtual computing environments (e.g., virtual machines) representing one or more unsafe computing environments.

In accordance with yet another aspect of the invention, a safe computing environment and a safe isolating/guarding component which serves to protect it can be provided as trusted components (e.g., trusted components provided in accordance with general principles of "Trusted Computing Group").

It will also be appreciated that various aspects of the invention can be combined. As such, it is possible, for example, to provide a trusted virtual machine monitor which effectively isolates and guards a trusted virtual machine against one or more other virtual machines that are not trusted and support various components (e.g., applications, tasks and/or services) that are not trusted in accordance with one embodiment of the invention.

The invention can be implemented in numerous ways, including, for example, a method, an apparatus, a computer readable medium, and a computing system (e.g., a computing device). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, mobile devices are becoming increasingly more popular. Today, wireless networks and mobile communication devices (e.g., Smartphones, cell phones, Personal Digital Assistants) are especially popular. Unfortunately, however, partly because of this popularity, more and more malicious attacks are being directed to wireless networks and mobile communication devices. In addition, recent developments, including relatively new services (e.g., email, file transfer and messaging), and use of common software platforms (e.g., Symbian, Embedded Linux, and Windows CE operating systems) has made mobile communication devices relatively more exposed to malicious attacks. The exposure to malicious attacks could become worse as the wireless networks and mobile communication devices continue to evolve rapidly. Today, wireless and/or portable communication devices (e.g., cell phones, Smartphones) can offer similar functionality as that more traditionally offered by Personal Computers (PCs). As a result, wireless and/or portable communication devices are likely to face similar security problems (e.g., worms, viruses) as those encountered in more traditional computing environments.

Examples of the most notorious threats to cell phones include the Skull, Cabir, and Mabir worms which have targeted the Symbian operating systems. Generally, an MMS-based worm can start attacking initial targets (hit-list) from the network. Each infected phone can scan its contact list and randomly pick up members to deliver a malicious attack in the form of a message. A person can trust an incoming message due to its attractive title or seemingly familiar source and activate the attached file and unwittingly get a phone infected. The infected phone can in turn get other phones infected, and so on. In contrast, a Blue-tooth based worm can take control of a victim phone's Blue-tooth interface and continuously scan for other Blue-tooth-enabled phones within its range. Once a new target has been detected, the worm can effectively connect to other devices and transfers a malicious message to them, and so on.

Taking the cell phone as an example, an active cell phone typically has two security states: susceptible and infected. A susceptible cell phone is not completely protected against worms and may get infected when exposed to a specific worm (e.g., CommWarrior). An infected cell phone can return back to the susceptible state when the user launches a protection (e.g., the CommWarrior patch from F-Secure or Symantec) partly because the cell phone is susceptible to other worm threats. Malware has many other undesirable affects including compromising the privacy of the users.

In addition, numerous applications and services are available from different entities and can be deployed on mobile devices. In other words, various entities including device vendors, network providers, and software vendors can effectively provide computer code and support the operation of a mobile device. As a result, providing a safe and manageable mobile device requires addressing numerous new challenges not generally seen in more conventional computing systems (e.g., conventional Personal Computers). To further add to this difficulty, future generations of mobile devices could be required to provide even more capabilities, and yet be safer and more manageable than the device in existence today. These capabilities can, for example, include the requirements set forth by the Open Mobile Terminal Platform (OMTP) which is a forum created by mobile network operators to discuss standards with manufacturers of cell phones and other mobile devices. The requirements set forth by the Open Mobile Terminal Platform (OMTP) are available from the OMTP organization and are hereby incorporated by reference herein for all purposes.

In view of the foregoing, improved techniques for serving or managing computing environments, and in particular mobile computing environments, would be useful.

Accordingly, the invention provides improved techniques for managing and protecting computing environments. It will be appreciated that the invention provides techniques that are especially useful for mobile computing environments.

In accordance with one aspect of the invention, a computing environment known or believed to be safe can be provided as a "safe computing environment" for ensuring the safety of a device and/or management of the device. It will be appreciated that a safe computing environment can be provided in a secure manner such that it cannot be adversely affected by one or more other computing environments that are not known or not believed to be safe ("unsafe computing environment"). As a result, various security and management activities can be securely performed from a safe computing environment to ensure the safety of a device and/or safely perform various management activities for a device despite the unsafe computing environments that may be supported by the device. In accordance with one embodiment of the invention, an isolating/guarding component can be initiated for a device as a safe component after its safety has been verified. The safe isolating/guarding component can effectively isolate and/or guard a safe computing environment operating on the device from one or more unsafe computing environments which may also operate on the device. It will be appreciated that the safety of the safe computing environment can also be verified before initiating it as a safe component. In a similar manner, the safety of one or more executable computing components (e.g., applications, tasks, services) can be verified before allowing them to be initiated as one or more safe components in the safe computing environment. The one or more safe components in the safe computing environment can be effectively isolated from the unsafe computing environment(s) and guarded (or protected) by the safe isolating/guarding component against any adverse interference from the unsafe computing environment(s). Yet, the one or more safe components are able to effectively access and/or monitor the unsafe computing environment(s) via the safe isolating/guarding component, thereby allowing the one or more safe components to securely monitor the unsafe computing environment(s) and/or perform various management operations in order to manage the unsafe computing environment(s) in a secure manner by performing various management operations. It will be appreciated that these management operations can, for example, include: monitoring the unsafe computing environment(s) to detect unauthorized use, removing and/or correcting computer program code deemed to be corrupted, and so on. More generally, various management activities including security enforcement, providing updates and/or configuration services, can be performed by one or more safe components which can act alone and/or in collaboration, for example, with one or more safe external sources (e.g., a trusted security sever, a trusted configuration server) to effectively ensure the safety of a device and manage it safely.

In accordance with another aspect of the invention, virtualization techniques can be utilized to provide a safe virtual computing environment in order to ensure the safety of a device and/or manage one or more other virtual computing environments representing unsafe computing environments that may also be operating on the device. In one embodiment, a safe virtual environment monitor (e.g., a virtual machine monitor) effectively isolates and protects a first virtual computing environment (e.g., a first virtual machine) which serves as a safe virtual computing environment from one or more other virtual computing environments (e.g., virtual machines) representing one or more unsafe computing environments.

In accordance with yet another aspect of the invention, a safe computing environment and a safe isolating/guarding component which serves to protect it can be provided as trusted components (e.g., trusted components provided in accordance with general principles of "Trusted Computing Group").

It will also be appreciated that various aspects of the invention can be combined. As such, it is possible, for example, to provide a trusted virtual machine monitor which effectively isolates and guards a trusted virtual machine against one or more other virtual machines that are not trusted and support various components (e.g., applications, tasks and/or services) that are not trusted in accordance with one embodiment of the invention.

Embodiments of these aspects of the invention are discussed below with reference to FIGS. 1A-4. However, those skilled in the art will readily appreciate that the detailed description given herein with respect to these figures is for explanatory purposes as the invention extends beyond these limited embodiments.

Figure 1A:
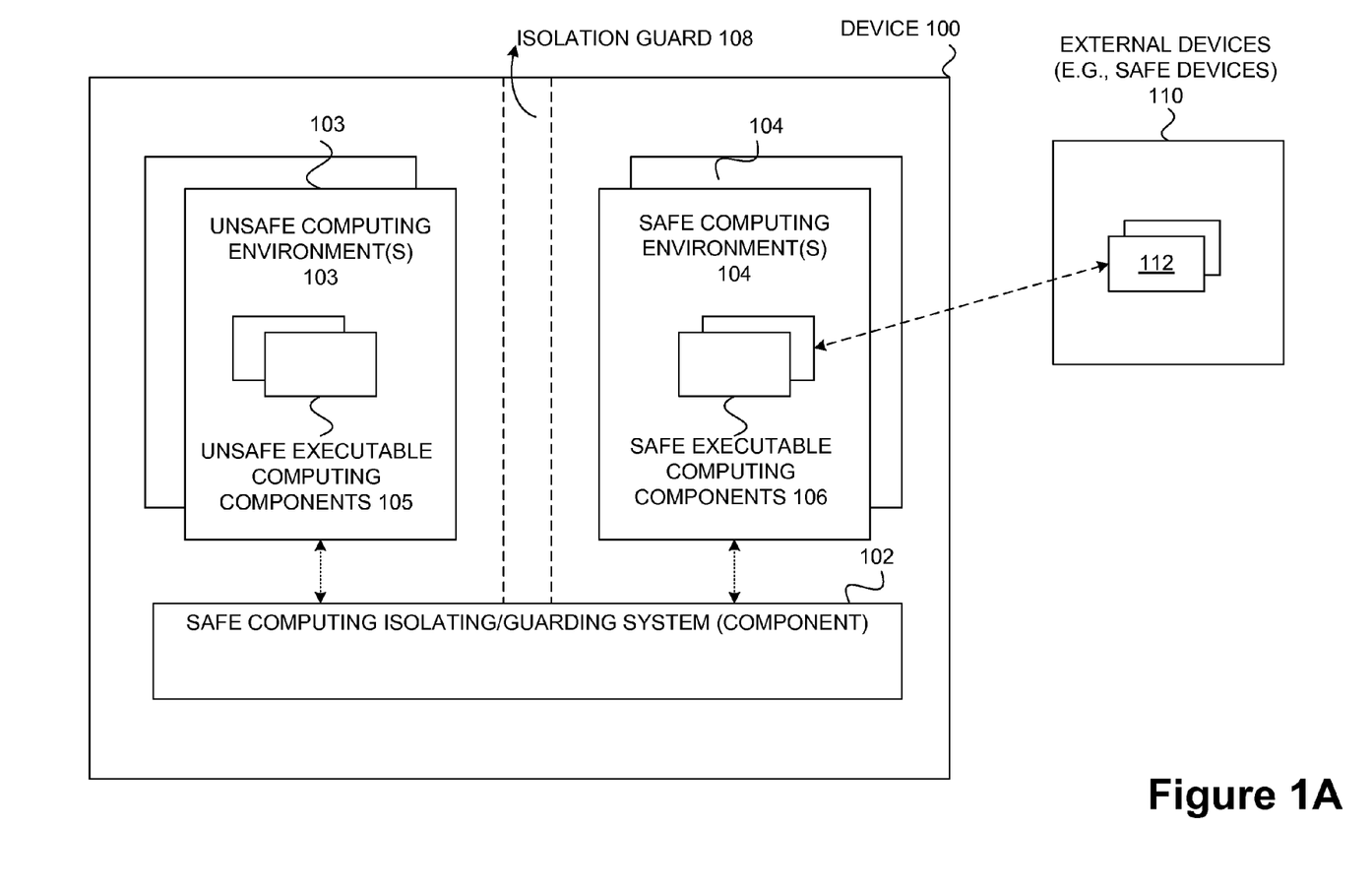
FIG. 1A depicts a device in accordance with one embodiment of the invention.

FIG. 1A depicts a device 100 in accordance with one embodiment of the invention. The device 100 can, for example, be a general purpose computer, a personal computer (PC), or a mobile device (e.g., a mobile phone, a Smartphone). Referring to FIG. 1A, a safe computing isolating/guarding system (component) 102 is effectively provided for the device 100. Generally, the computing isolating/guarding system (component) 102 is known and/or believed to be safe for operating on the device 100. It will be appreciated that the computing isolating/guarding system (component) 102 can, for example, be a trusted component trusted to be safe for the device 100, and as such, it can be initiated as a trusted component for the device 100, as will be described in greater detail below.

In any case, the computing isolating/guarding system (component) 102 is operable to effectively isolate and/or guard one or more computing environments that are known and/or believed to be safe ("safe computing environments") 104 from one or more computing environments that are not known or believed to be safe computing environments ("unsafe computing environments") 103. Similar to the safe isolating/guarding system (component) 102, a safe computing environment 104 can be initiated for the device 100. The safe isolating/guarding system 102 and/or safe computing environment 104 can, for example, be initiated as components that are trusted (or trusted to be safe), also known as "trusted components". In addition, one or more safe executable computing components 106 can be initiated, for example, as one or more components that are trusted to be safe ("trusted executable components") for execution on the device 100. In contrast, an unsafe computing environment 103 can, for example, be a computing environment that is not a trusted computing environment (an "untrusted" computing environment). As such, an unsafe executable computing component executing in an unsafe computing environments 103 can, for example, be an "untrusted" executable component.

As noted above, the safe computing isolating/guarding system (component) 102 is operable to effectively isolate and/or guard one or more safe computing environments 104 from one or more unsafe computing environments 103. In effect, the computing isolating/guarding system (component) 102 can provide an isolation guard (or guarding layer) 108 that does not allow any one of the unsafe computing environments 103 to access any one of the safe computing environments 104. However, it will be appreciated that the safe computing isolating/guarding system (component) 102 can access the one or more safe computing environments 104 and one or more unsafe computing environments 103. As a result, safe computing isolating/guarding system (component) 102 can effectively allow one or more safe executable computing components 106 operating in the one or more safe computing environments 104 to access the one or more unsafe computing environments 103. In other words, a safe executable computing component 106 can, for example, effectively access one or more of the unsafe computing environments 103 via the safe computing isolating/guarding system (component) 102 but be effectively isolated and guarded from the unsafe computing environments 103. As a result, the execution of a safe executable computing component 106 cannot be adversely affected by any one of the unsafe executable computing components 105 in the unsafe computing environments 103.

It will also be appreciated that a safe executable computing component 106 (e.g., a trusted component) 106 can effectively access and/or monitor one or more unsafe executable computing components (e.g., one or more untrusted components) 105 via the safe computing isolating/guarding system (component) 102 while being protected from the unsafe executable computing components 105, thereby allowing secure access and/or monitoring of the one or more unsafe executable components from the safe computing environment 104 effectively isolated and thus secured against any interference from the unsafe computing environments 103 and unsafe executable computing components 105 executing therein.

Generally, the one or more safety executable components 106 can be used for safety and/or management of the device 100. As such, a safe executable component 106 can, for example, be used for various management activities and/or operations including operation related to the safety of the device 100 (e.g., detection of unauthorized use of the device 100). Unauthorized use of the device 100 can, for example, include unauthorized use of one or more resources (not shown) associated with device 100. By way of example, a safe executable component 106 can be operable to effectively detect and/or cause detection of unauthorized use by an unsafe executable computing component 105 with respect to an attempt to send unauthorized messages to another device and/or adversely affect the operations of a safe component 105 or another unsafe component 106 of the device 100. As such, it will be appreciated that a safe executable computing component 106 which is effectively secured by the safe computing isolating/guarding system (component) 106 can, among other things, be used for detection of malicious software ("Malware") including, for example, various viruses and worms.

Other exemplary management activities which can be effectively performed by a safe executable computing component 106 with respect to the unsafe computing environments 103 and unsafe executable components 105 can, for example, include: configuring one or more unsafe executable computing components 105 for execution on the device 100, obtaining one or more unsafe executable computing components 105, obtaining updates and/or updating one or more unsafe executable computing environments 103 and/or one or more unsafe executable computing components 105, obtaining and/or installing corrections to one or more unsafe executable computing components 105, error detection and/or error recovery from an error associated with the execution of one or more unsafe executable computing components 105.

More generally, one or more safe executable computing components 106 can effectively monitor the one or more unsafe computing environments 103 so that one or more management operations can be performed in response to the monitoring activities. As such, the one or more unsafe computing environments 103 can, for example, be monitored for unauthorized use of the device 100 so that remedial action can be taken. Remedial action can, for example, be taken by one or more safe executable computing component 106 and/or effectively facilitated by them. Remedial action taken can, for example, include: denying an unsafe computing components 105 access to one or more resources of the device 100 (e.g., memory, system calls, communication ports), replacing and/or correcting an unsafe executable computing component 103 which is deemed to be corrupted, and so on.

It should be noted that safe executable computing component 106 can be further operable to communicate with one or more other entities in order to effectively manage the device 100. Referring to FIG. 1A, one or more safe executable computing components 106 can be operable to communicate with one or more external devices (e.g., safe devices) 110 and/or more one or more components (e.g., safe components 112) associated with them. It should also be noted that one or more safe executable computing components 106 can be used to effectively manage one or more safe computing environments 104, as well as the one or more unsafe computing environments 105. Given that the unsafe computing environments 105 can typically pose a more serious threat and can present a more difficult challenge with respect to ensuring the safety and management of the device 100, management of the unsafe computing environments 103 will be discussed in greater detail. However, it will be apparent to those skilled in the art that the one or more safe executable computing components 106 can be used to effectively manage virtually all aspects of the device 100. Furthermore, a safe executable computing component 106 can effectively serve as an agent of the external device (e.g., a trusted server) 110 in order to allow remote management of the device 100 in a safe and secure manner.

It will also be appreciated that the safety of the computing isolating/guarding system (component) 106, computing environments 104, and/or executable computing components 106 can be verified before allowing them to be initiated on the device 100. Referring to FIG. 1A, the device 100 can be operable to effectively verify the safety of the computing isolating/guarding system (component) 106, computing environments 104, and/or executable computing components 106 before allowing them to be initiated an/or initiating them on the device 100. Verification of safety of these components is described in greater detail below with respect to FIG. 2A in accordance with one embodiment of the invention.

Figure 1B:
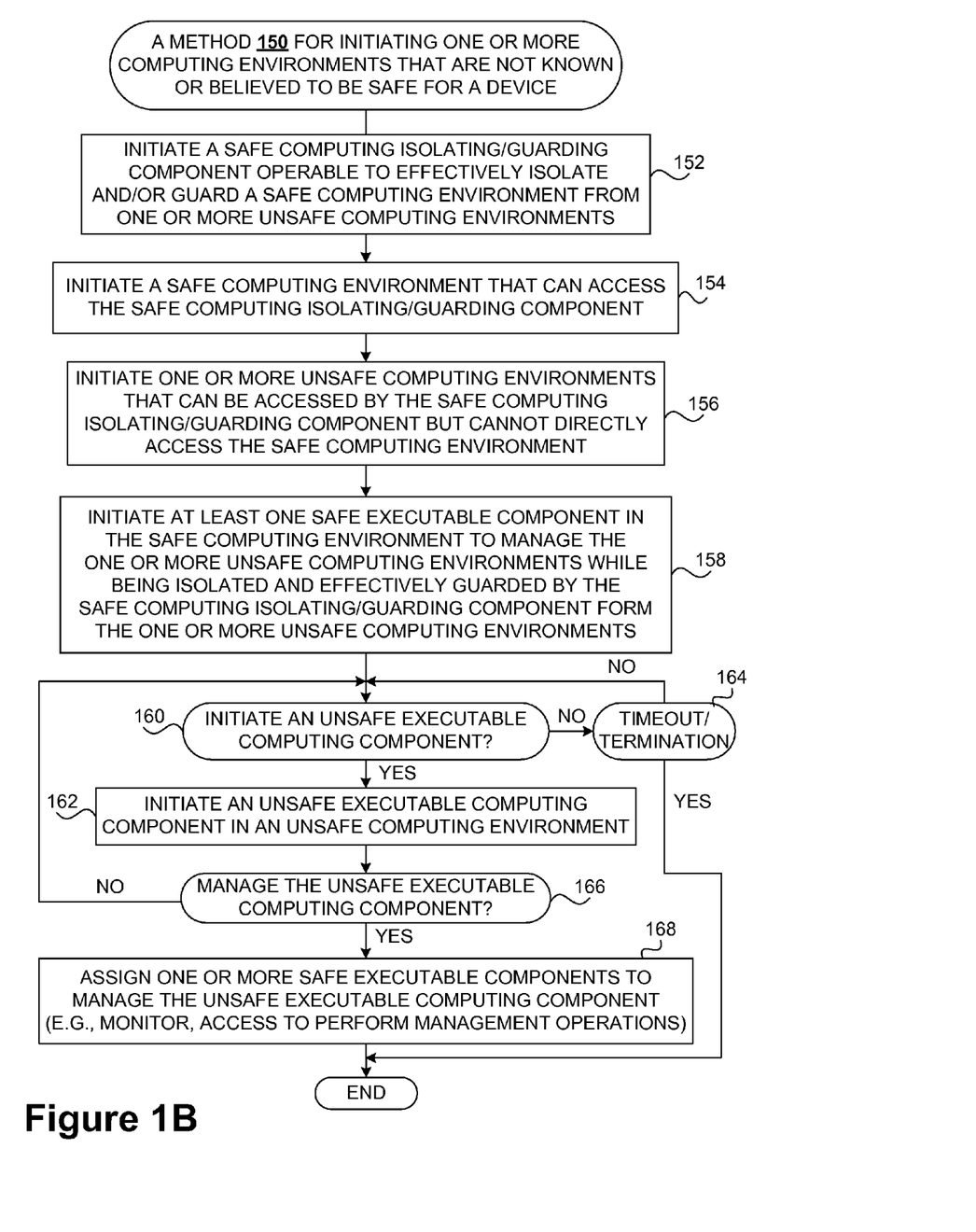
FIG. 1B depicts a method for initiating one or more computing environments for a device in accordance with one embodiment of the invention.

However, referring now to FIG. 1B, a method 150 for initiating one or more computing environments for a device is depicted. Typically, the one or more computing environments are not known or not believed to be safe for the device. The method 150 can, for example, be performed by the device 100 (shown in FIG. 1A).

Referring to FIG. 1B, initially, a safe computing isolating/guarding component is initiated (152). The safe computing isolating/guarding component is operable to effectively isolate and/or guard a safe computing environment from one or more unsafe computing environments. A safe computing environment that can access the safe computing isolating/guarding component is also initiated (154). In addition, one or more unsafe computing environments that can be accessed by the safe computing isolating/guarding component but cannot directly access the safe computing environment are initiated (156). As a result, the safe computing environment can be provided as a secured computing environment which cannot be directly accessed by the one or more unsafe computing environments.

Generally, initiation of the safe computing isolating/guarding component, safe computing environment, and/or one or more unsafe computing environments can be performed independently. However, it may be desirable to initiate the safe computing isolating/guarding component (152) first in order to protect the safe computing environment. Similarly, the safe computing environment can be initiated (154) before initiation (156) of the one or more unsafe computing environments in order to effectively protect the device form the one or more unsafe computing environments (e.g., a safe computing environment can be initiated first to effectively monitor the one or more unsafe computing environments to detect unsafe and/or unauthorized behavior).

After initiating (154) of the safe computing environment, at least one safe executable (computing) component is initiated (158) in the safe computing environment. Generally, a safe executable component can monitor and/or manage one or more unsafe computing environments via the safe computing isolating/guarding component. Moreover, the safe executable component can perform various management and serving operations while being isolated and effectively guarded by the safe computing isolating/guarding component. In other words, the one or more unsafe computing environments cannot adversely affect the safe executable component or its activities or operations.

It will be appreciated that the management of the one or more unsafe computing environments can include effectively managing one or more unsafe executable (computing) components executing in the one or more unsafe computing environment. As such, it can be determined (160) whether to initiate an unsafe executable component in an unsafe computing environment. In effect, the method 150 can wait for an unsafe executable component to be initiated (162) in an unsafe computing environment or end as a result of a timeout and/or termination (164) (e.g., termination of the operation of the device as a result of a shut down request). After an unsafe executable component is initiated (162), it can be determined (166) whether to manage the unsafe executable component by one or more safe executable components securely executing in the safe computing environment. Accordingly, one or more safe executable components can be effectively assigned (168) to manage the unsafe executable component. By way of the example, a safe executable component can monitor the activities associated with the execution of the unsafe executable component to ensure the safety of the device. In addition, the safe executable component may access the unsafe executable component and/or its operating computing environment in order to perform various management and/or security activities (e.g., reinstall, remove, update and/or fix computer code including underlying operating system provided for the execution of the unsafe executable component). Additionally, more unsafe executable components can be initiated (160), and one or more safe executable components can be effectively assigned (168) to manage them, in a similar manner as discussed above. The method 150 can end as a result of a timeout and/or termination (164).

Figure 2A:
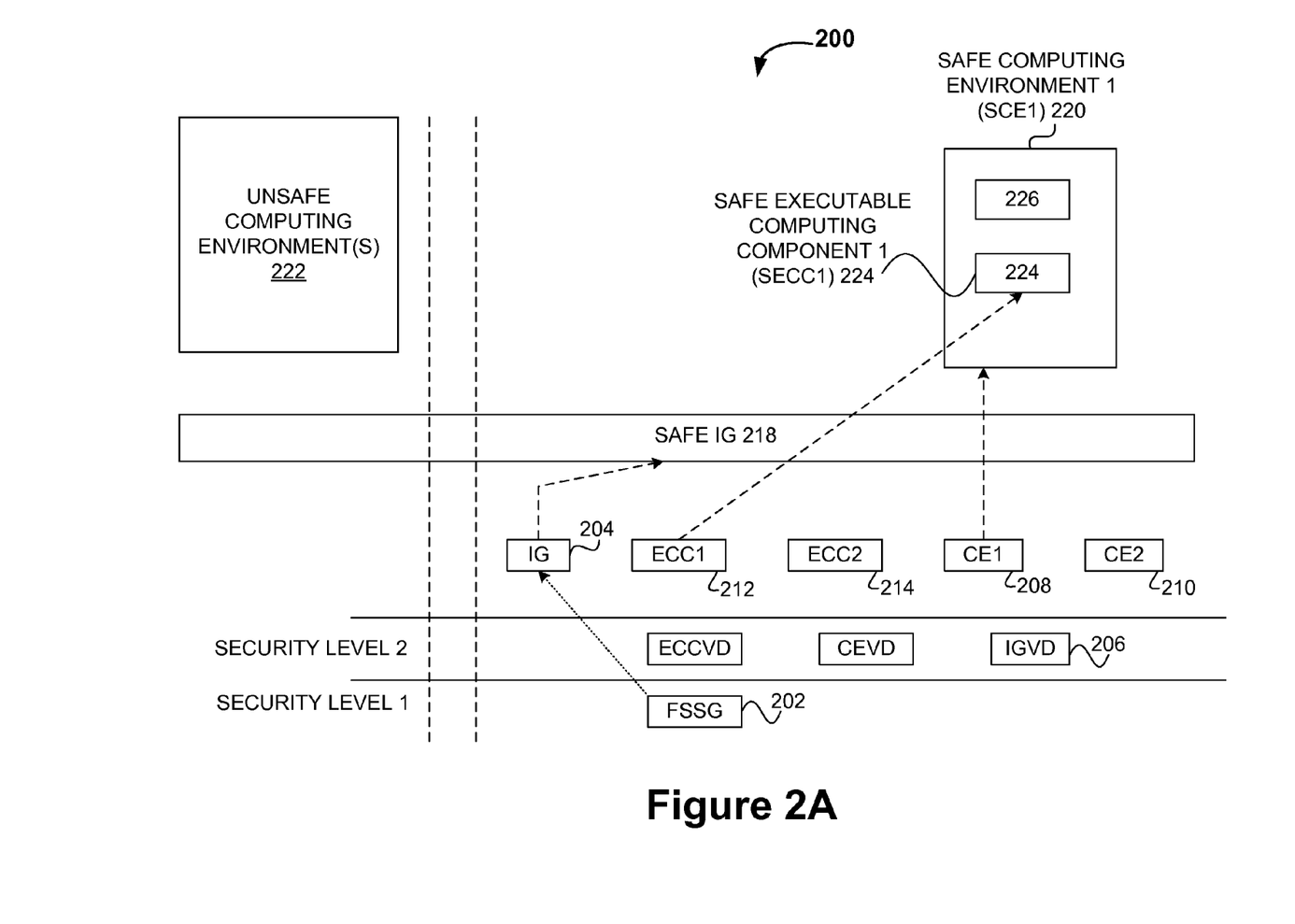
FIG. 2A depicts a general computing environment in accordance with one embodiment of the invention.

As noted above, the safety of the computing isolating/guarding system (component) 102, computing environments 104, and/or executable computing components 106 can be verified before allowing them to be initiated on the device 100 (shown in FIG. 1A). To further elaborate, FIG. 2A depicts a general computing environment 200 in accordance with one embodiment of the invention. Referring now to FIG. 2A, a first secured safety guard (FSSG) 202 effectively serves as the first level of security (Level 1) and as such is generally protected in a very secured area (e.g., securely protected in hardware and/or firmware). Those skilled in the art will appreciate that the first secured safety guard (FSSG) 202 can, for example, be provided as a Trusted Platform Module (TPM) implemented in hardware. In any case, first secured safety guard (FSSG) 202 can effectively verify the safety of computer program code for an isolating/guarding (IG) component 204 before allowing it to be initiated in the computing environment 200. More particularly, the first secured safety guard (FSSG) 202 can, for example, effectively verify the integrity of the computer program code for the isolating/guarding component 204 by verifying the verification data (IGVD) 206. The verification data (IGVD) 206 can, for example, be secured such that it can only be accessed by the first secured safety guard (FSSG) 202 or another component effectively authorized and/or verified by it.

By way of example, the verification data 206 can represent integrity values stored for the isolating/guarding component 204. Those skilled in the art will readily appreciate that integrity values can, for example, be effectively determined (e.g., measured) by using hash values, checksums, and/or signatures of various computing components. In general, one or more verification techniques can be used to ensure that the current measured values are consistent with known (or expected) values of the verification data (IGVD) 206 which are typically securely stored. As such, the first secured safety guard (FSSG) 202 can effectively compare the current integrity values of the isolating/guarding component (IG) 204 to the known integrity values stored as verification data (IGVD) 206 in order to determine whether the computing code stored in memory for the isolating/guarding component 204 has maintained its integrity. It should be noted that the computer program code for isolating/guarding component 204 need not be stored with the verification data (IGVD) 206 in a relatively higher security (level 2), although it can be stored as such. The computer program code for the isolating/guarding component 204 can be stored, for example, with the computer program code for one or more safe computing environments (208 and 210) and safe computing components 212 and 214.

In any case, if the safety (e.g., integrity) of the computer program code for the isolating/guarding component (IG) 204 is verified by the first secured safety guard (FSSG) 202, the isolating/guarding component (IG) 204 can be initiated effectively as a safe isolating/guarding component 218 in order to effectively secure at least one safe computing environment 220 from one or more unsafe computing environments 222. It should be noted that the safety of the safe computing environment (SCE1) 220 can also be verified before it is initiated. In other words, the safety of the computer program code for a computing environment (CE1) 208 can be verified before initiating it as a safe computing environment (SCE1) 220. This verification can, for example, be performed in a similar manner as the verification of the computer code for the isolating/guarding component (IG) 204 noted above. In a similar manner, the safety of the computer program code for one or more executable computing components (ECC1 and ECC2) 212 and 214 can be verified before initiating them as the safe executable components 224 and 226 in the safe computing environment 220. It will be appreciated that the safe isolating/guarding component 218 can be operable to effectively verify the safety of the computer program code for the computing environments (ECC1 and ECC2) 208 and 210 and/or executable computing components (ECC1 and ECC2) 212 and 214.

Figure 2B:
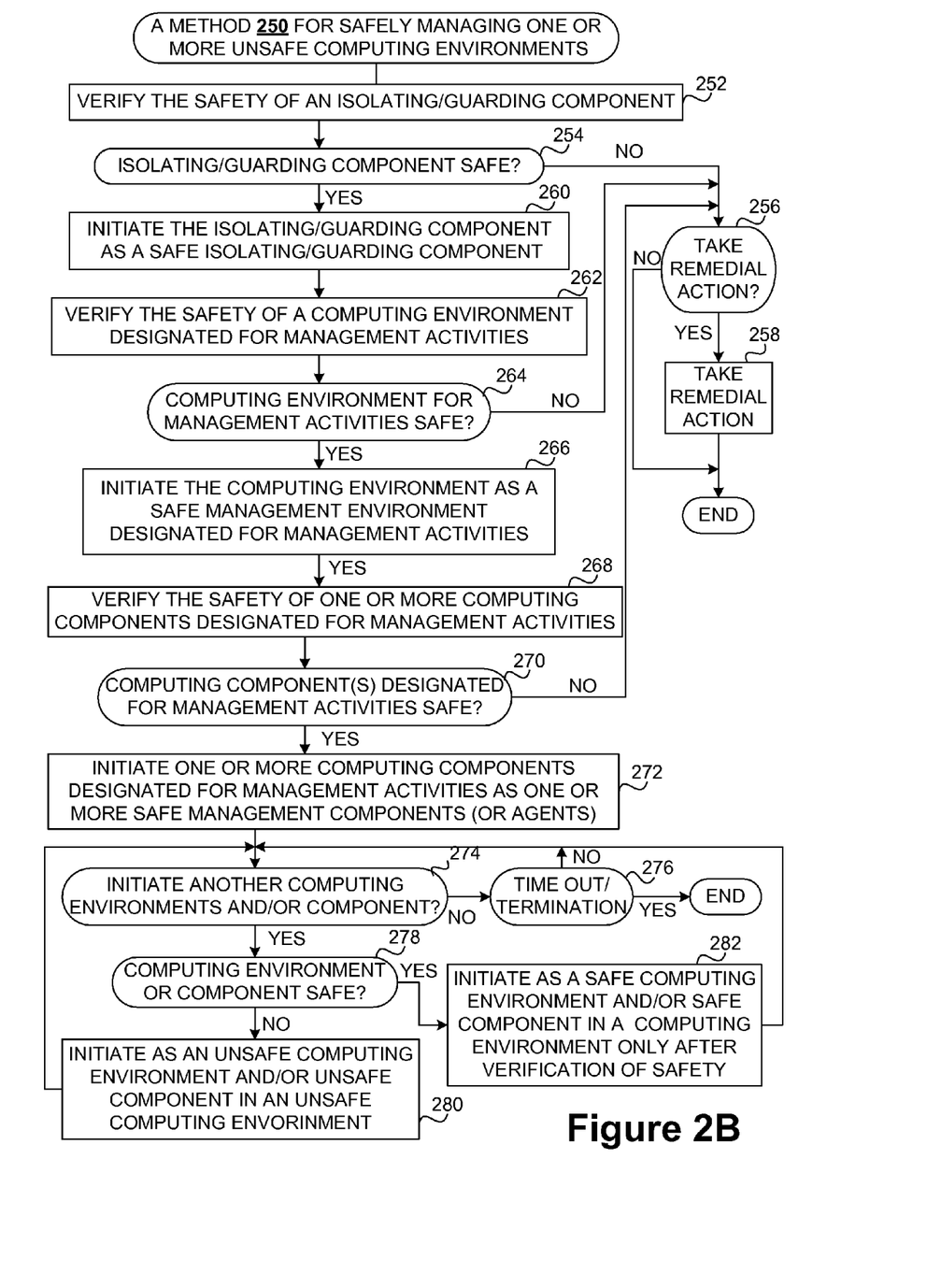
FIG. 2B depicts a method for safely managing one or more unsafe computing environments in accordance with one embodiment of the invention.

FIG. 2B depicts a method 250 for safely managing one or more unsafe computing environments in accordance with one embodiment of the invention. Initially, the safety of an isolating/guarding component (or system) is verified (252). By way of example, the integrity of the isolating/guarding component can be verified as noted above. Accordingly, it can be determined (254) whether the safety of the isolating/guarding component can be successfully verified. If it is determined (254) that the safety of the isolating/guarding component is not successfully verified, it can be determined (256) whether to take remedial action and remedial action can be taken accordingly (258). Remedial action can, for example, attempt to correct the isolating/guarding component and/or obtain the correct version of the isolation/guarding component. As such, the method 250 need not necessarily end after remedial action is taken (258) even though it is depicted as such in FIG. 2B for the sake of simplicity.

In any case, if it is determined (254) that the isolating/guarding component is safe, it can be initiated (260) as a safe isolating/guarding component. As noted above, the isolating/guarding component can effectively serve to isolate and guard a safe computing environment from one or more unsafe computing environments. After the safe isolating/guarding component is initiated (260), the safety of a computing environment designated for management activities associated with one or more unsafe computing environments is verified (264). Accordingly, the computing environment designated for management activities can be initiated (266) as a safe management environment if its safety can be successfully verified (264). Otherwise, remedial action may be taken (258) and the method 250 can end, in a similar manner as described above. After initiating (266) the safe computing environment, the method 250 can proceed to verify (268) the safety of one or more computing components that are designated for management activities in the safe management environment initiated (260) for that purpose. As a result, one or more computing components which are designated for management activities can be initiated as one or more safe management components (e.g., management agents) in a safe computing environment. Subsequently, it can be determined (274) whether one or more computing components and/or environments are to be initiated. In effect, the method 250 can wait for a determination (274) that a computing environment or computing component is to be initiated or end as a result of a timeout/termination (276). If it is determined (274) that a computing environment and/or component are to be initiated, it is determined (278) whether the computing environment and/or component are safe. As such, if it is determined (278) that a computing environment and/or a computing component is not safe, the computing environment and/or computing component can be initiated as an unsafe computing environment and/or as an unsafe computing component in an unsafe computing environment. Thereafter, the method 250 can proceed to determine (274) whether another computing environment and/or component are to be initiated and can proceed, in a similar manner as discussed above. On the other hand, if it is determined (278) that the computing environment and/or computing component are safe (or ultimately determined to be safe after verification of their safety), a safe computing environment and/or safe computing component can be initiated (282) after appropriate safety verifications (e.g., verification of integrity of computer program code) have been successfully performed before it is determined (274) whether another computing environment and/or component are to be initiated. The method 250 can end as a result of a timeout and/or termination (276).

Those skilled in the art will appreciate that an isolating/guarding system (or component) can, for example, be provided as virtual computing environment monitoring system (or component) operable to effectively isolate and/or guard a first virtual computing environment provided as a safe computing environment from one or more other virtual computing environments not deemed to be safe, in accordance with one embodiment of the invention. The virtual computing environment monitoring system (or component) would be able to access the safe virtual computing environment and the other one or more virtual computing environments not deemed to be safe and would effectively allow the safe virtual computing environment to access the one or more other virtual computing environments while being protected from them. By way of example, a virtual machine monitor (also known as a hypervisor) can be operable to effectively isolate and guard a virtual machine from one or more other virtual machines. Furthermore, an isolating/guarding component and/or a virtual computing environment can be provided as trusted components. As such, a trusted virtual computing environment monitoring system (e.g., a trusted virtual machine monitor) can effectively isolate and guard a trusted virtual computing environment (e.g., a trusted virtual machine) from one or more other virtual computing environments that are not trusted ("untrusted virtual computing environments").

Figure 3A:
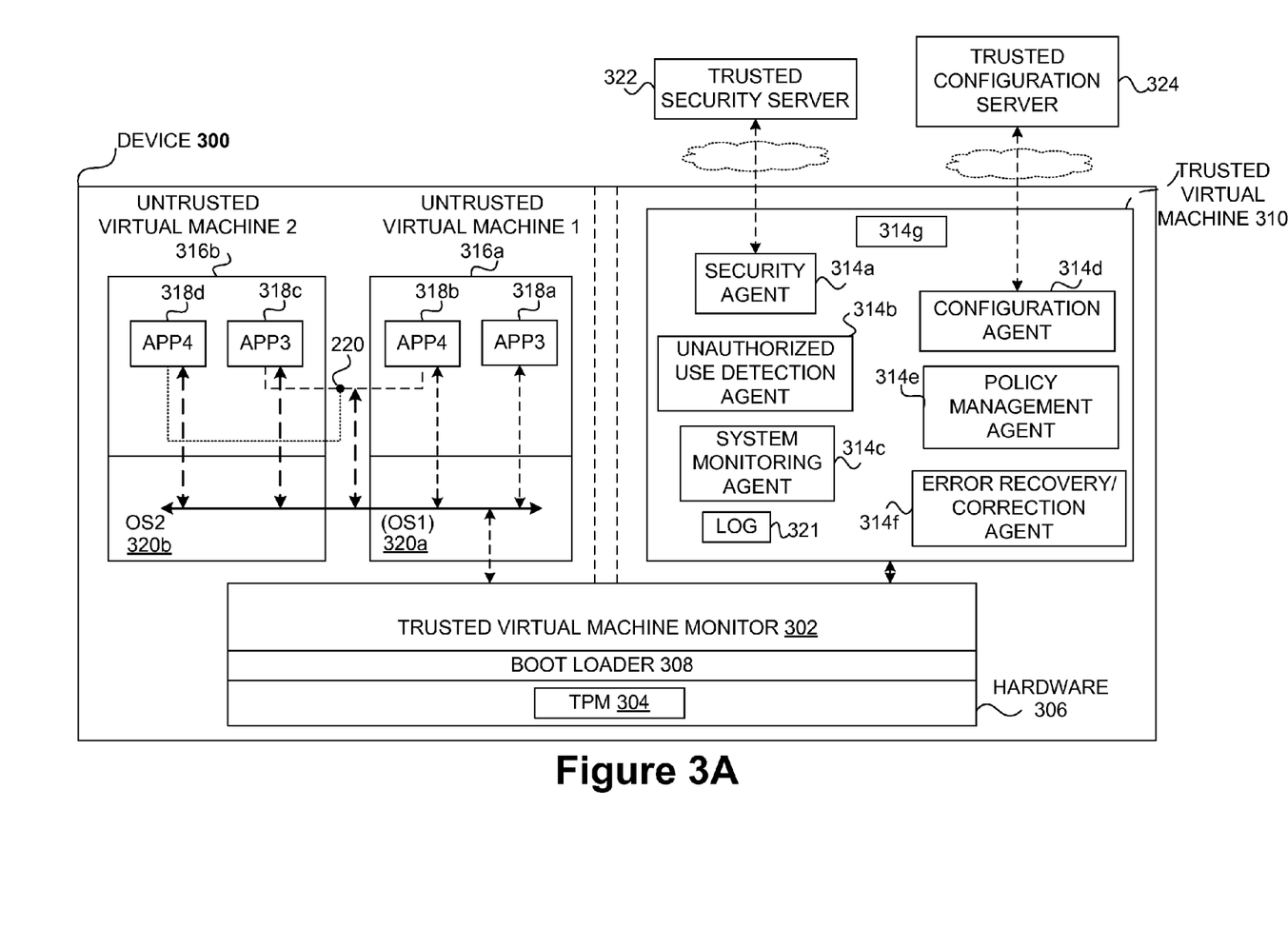
FIG. 3A depicts a trusted virtual machine monitor effectively provided for a device in accordance with one embodiment of the invention.

To further elaborate, FIG. 3A depicts a trusted virtual machine monitor 302 effectively provided for a device 300 in accordance with one embodiment of the invention. Referring to FIG. 3A, a Trusted Platform Module (TPM) 304 can be effectively provided as hardware and/or in a hardware layer 306 of the device 300. The Trusted Platform Module (TPM) 304 can, for example, be a general Trusted Platform Module (TPM) provided for a general computing device, or a Mobile Trusted platform Module (MTM) provided for a mobile device. The Trusted Platform Module (TPM) 302 can be provided as a Core Root of Trust Measurement (CRTM), and as such be the first component initiated for the device 300 (e.g., first component to be initiated when the device 300 is started or powered on).

When the Trusted Platform Module (TPM) 302 is initiated, it can, for example, measure the integrity of a boot loader 308 (or another operating component) before allowing the boot loader 308 to be initiated for the device 300. To boot loader 308 can be operable to effectively start operations of the device 300 (e.g., a boot loader can start an operating system for the device 300). Moreover, the boot loader 308 can effectively verify the integrity of computer program code for a virtual machine monitor before allowing it to be initiated as the trusted virtual machine monitor 302. The trusted virtual machine monitor 302 can be operable to verify the integrity of computer program code for a first virtual machine before allowing it to be initiated as a trusted virtual machine 310 representing a trusted computing environment. In addition, the virtual machine monitor 302 can verify the integrity of various executable computing components provided primarily for the management activities of the device 300 before initiating them in the trusted virtual machine 310 as trusted components (or agents) 314. As shown in FIG. 3A, trusted components (or agents) 314 can, for example, include a security agent 314a, and an unauthorized use detection agent 314b, and a system monitoring agent 314c provided for managing the security of the device 300. More particularly, the system monitoring agent 314c can effectively monitor the untrusted virtual machines 316 via the trusted virtual machine monitor 302. This means that the system monitoring agent 314c can effectively monitor various applications, tasks and/or services 318 being executed in the untrusted virtual machines 316, as well operating systems 1 and 2 (320), and an interface 220 which may be provided for communication between the applications 318. As it will be appreciated, the system monitoring agent 314c can also effectively monitor communication between the applications 318.

The information gathered by the system monitoring agent 314c can be stored in a log (or a database) 321. The monitored information can be used by the unauthorized use detection agent 314b to effectively detect unauthorized use of the device 300. Unauthorized use can, for example, be detected based on the pattern of use of the applications, tasks and/or services 318 and/or their effective behavior. As another example, network traffic associated with the applications, tasks and/or services 318 can be monitored to detect activities that may suggest unauthorized use of the device 300. As yet another example, one or more system calls can be effectively monitored to detect unauthorized use of the device 300. Monitoring of the system calls can, for example, be performed as described in greater detail in the pending U.S. patent application Ser. No. 12/025,678 which is hereby incorporated by reference herein in its entirety and for all purposes. More generally, unauthorized use can be detected based on one or more criteria (e.g., policies and/or rules), which can be obtained by the system monitoring agent 314c.

It should be noted that unauthorized use can be detected in collaboration with an external entity. As such, a security agent 314a can, for example, communicate with a trusted security server 322 which can effectively enforce various security policies and/or provide them to the security agent 314a. As such, the security agent 314a may be configured to communicate information to the trusted security server 322 and/or the unauthorized use detection agent 314c so that unauthorized use can be detected. Detection of unauthorized use can, for example, include detecting malicious software ("Malware"), such as, for example, various worms or viruses. It will be appreciated that many more management operations can be generally performed by a trusted agent 314g in a trusted virtual machine 310. As another example, referring back to FIG. 3A, the configuration agent 314d can effectively communicate with a trusted configuration server 324 to perform various configuration operations for configuring the untrusted virtual machines 316 and/or the trusted virtual machine 310.

As another example, the policy managing agent 314e can effectively enforce various management policies for the device 300. By way of example, various policies regarding the size, type and/or throughput of data generated by the device 300 can be monitored and effectively enforced. As yet another example, an error recovery/correction agent 314f can effectively attempt to recover corrupted computer program code for the applications, tasks and/or services 318 and/or any one of the trusted agents 314. As such, the error recovery/correction agent 314f can be operable to communicate with the trusted configuration server 324 to obtain a correct (or corrected) version of computer program code that has been maliciously and/or accidentally corrupted, replace and/or remove computer program code deemed to be defective and/or corrupted.

The configuration agent 314d can also be operable to provide routine updates for computer program code operating in the untrusted virtual machines 316 and/or trusted virtual machine 310. The error recovery/correction agent 314f can be operable to perform error recovery for computer program code deemed to be defective and/or corrupted. As such, a trusted agent 314, among other things, can allow detection of unauthorized use by, for example, detecting activities that are not deemed "normal" and effectively communicate such abnormal activities with the trusted servers 322 and/or 324 so that appropriate actions can be taken. Such activities can, for example, include: removing, reinstalling, patching an application, tasks and/or services 318 or operating systems 320, updating the system with new computer code, changing configurations of various application or system programs, and so on. This allows performing various management operations including restoring or reinstalling complete operating systems in order to protect the device 300 and maintain a safe operating mode despite various untrusted components which may be operating on the device 300.

Figure 3B:
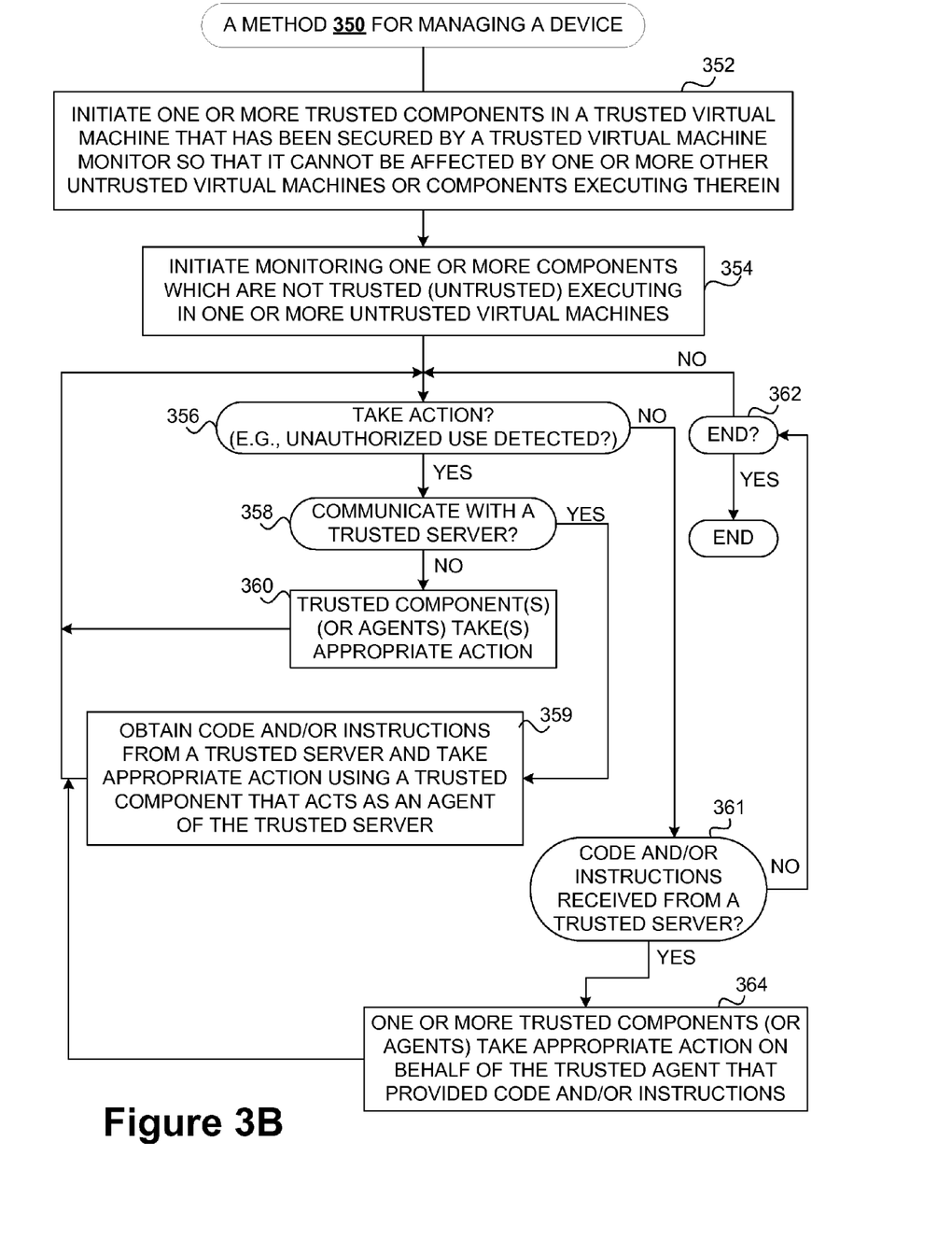
FIG. 3B depicts a method for managing a device in accordance with one embodiment of the invention.

FIG. 3B depicts a method 350 for managing a device in accordance with one embodiment of the invention. The method 350 can, for example, be performed by the device 300 shown in FIG. 3A. Initially, one or more trusted (computing) components are initiated (352) in a trusted virtual machine that has been secured by a trusted virtual machine monitor. As a result, one or more trusted components operating in the trusted virtual machine cannot be adversely affected by any one of one or more untrusted virtual machines or their components operating on the device. Next, monitoring of one or more untrusted components which are executing in one or more untrusted virtual machines is initiated (354). In other words, one or more trusted components in the trusted virtual machine start monitoring one or more untrusted executable components executing in one or more untrusted virtual machines. Based on the monitoring (354), it is determined (356) whether to take action. By way of example, the monitoring (354) can effectively detect unauthorized use requiring remedial action. If it is determined (356) to take action, it is determined (358) whether to communicate with a trusted server. As such, computer program code and/or general or specific instructions can be obtained from the trusted server so that appropriate action can be taken (359). Typically, appropriate action can be taken by one or more trusted components operating in the trusted virtual machine. These components can, for example, act as the agents of the trusted server. On the other hand, if it is determined (358) not to communicate with a trusted server, one or more trusted components (or agents) can take appropriate action (360). After appropriate action is taken, either by a trusted component alone (360) or in connection with a trusted server (359), the method 350 can proceed to determine (356) whether to take action based on the monitoring of the untrusted components.

It should be noted that computer program code and/or general or specific instructions (general or specific instructions) can effectively be provided by one or more trusted servers in order to initiate management activities for the device. In other words, a trusted server can initiate communication and effectively provide data to one or more trusted components in order to effectively initiate management operations. As such, the method 350 can effectively wait to receive code and/or instructions from a trusted server (361) or end if it is determined (362) to effectively end the management operations for the device. If it is determined (360) that computer program code and/or general or specific instructions are received from a trusted server, one or more trusted components (or agents) can take appropriate action (364). This action can be taken on behalf of the trusted server that provided the computer program code and/or instructions in order to effectively allow the trusted server to manage the device remotely via a trusted component (agent) in a trusted environment and guarded against interference from various untrusted environments components that may also be operating on the device. The method 350 can end if it is determined (362) to effectively end the management of the device. By way of example, management of the device can end when the device has been shut down, at the election of a user of the device, or an external entity (e.g., trusted server).

Figure 4:
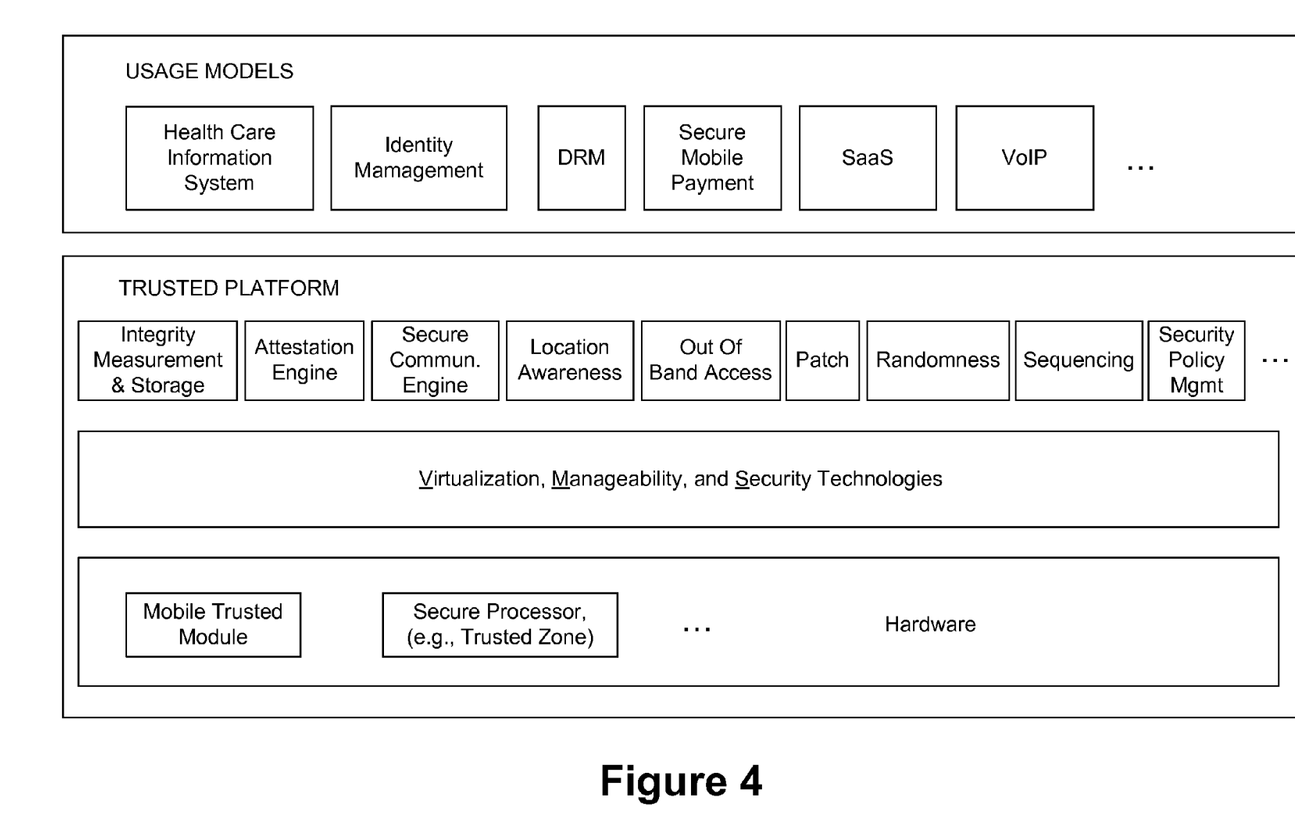
FIG. 4 depicts various capabilities including virtualization, manageability, and security which can be provided for mobile devices in accordance with the invention.

As noted above, future generations of mobile devices could be required to provide more capabilities and be safer and more manageable than the devices that are available today. These capabilities can, for example, include the requirements set forth by the Open Mobile Terminal Platform (OMTP) which is a forum created by mobile network operators to discuss standards with manufacturers of cell phones and other mobile devices To further elaborate, FIG. 4 depicts various capabilities including virtualization, manageability and security which can be provided for mobile devices in accordance with the invention. These capabilities can, for example, be provided in accordance with the requirements set forth by and available from the Open Mobile Terminal Platform (OMTP) which are hereby incorporated by references herein for all purposes.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A device comprising:
a trusted platform module, which in response to the device being initiated verifies the integrity of a boot loader before allowing the boot loader to be initiated, the boot loader in response to being initiated verifying the integrity of a virtual machine monitor before allowing the virtual machine monitor to be initiated as a trusted virtual machine monitor;
the trusted virtual machine monitor configured to verify the integrity of one or more virtual machines to serve as trusted virtual machines to execute one or more agents performing one or more management operations for device computing environment safety, the trusted virtual machine monitor operable to:
effectively isolate and/or guard one or more safe virtual computing machines that can be initiated on said device from one or more unsafe virtual computing machines which can be also initiated on said device, thereby allowing said one or more safe virtual computing machines to be effectively provided as one or more secure virtual computing machines which cannot be directly accessed by said one or more unsafe virtual computing machines, and
allow said one or more safe virtual computing machines to effectively access said one or more unsafe virtual computing machines via said trusted virtual machine monitor, thereby allowing said one or more safe virtual computing machines to be guarded against interference from said one or more unsafe virtual computing machines and yet be able to access and/or monitor said one or more unsafe virtual computing machines;
wherein at least one agent in a safe virtual computing machine is operable to perform a management function to protect the unsafe virtual computing machine from at least one security or safety risk, and
the trusted virtual machine monitor protecting the at least one agent from the unsafe virtual computing machine.

2. The device of claim 1, wherein said one or more agents are operable to effectively monitor execution and/or activities associated with execution of said one or more unsafe executable computing components.

3. The device of claim 1,
wherein said trusted virtual machine monitor is a trusted component trusted to be safe for execution on said device,
wherein said one or more safe virtual computing machines are trusted to be safe for execution on said device.

4. The device of claim 1, wherein said device is further operable to perform the following:
verify safety of a first virtual machine monitor before allowing it to be initiated on said device as said trusted virtual machine monitor;
verify safety of first one or more virtual computing machines before allowing them to be initiated on said device as said one or more safe virtual computing environments; and
verify safety of first one or more executable computing components before allowing them to be initiated on said device as said safe one or more executable computing components.

5. The device of claim 1, wherein said management operations include one or more of the following:
detection of unauthorized use of said device;
detection of unauthorized use of one or more resources associated with said device;
detection of unauthorized execution of an unsafe executable computing component not executing in said one or more safe virtual computing machines;
detecting that an unsafe executable computing component which is not executing in said one or more safe virtual computing machines is attempting to use one or more resources without proper authorization;
configuration of at least one executable computing component for execution on said device;
obtaining computer program code for at least one executable computing component;
installing computer program code for at least one executable computing component on said device;
obtaining updates for and/or updating at least one executable computing component;
error detection and/or recovery of computer program code for at least one executable computing component; and
one or more device management services in compliance with management services of the Open Mobile Terminal Platform (OMTP).

6. The device of claim 1, wherein said one of more management operations include:
monitoring one or more unsafe executable computing components to detect unauthorized use of said device by said one or more unsafe executable computing components; and
taking remedial action when said detecting detects unauthorized use of said device by said one or more unsafe executable computing components.

7. The device of claim 6, wherein said remedial action includes one or more of the following:
denying at least one of said one or more unsafe executable computing components access to one or more resources of said device;
not allowing at least one of said one or more unsafe executable computing components to be executed on said device;
replacing at least one of said one or more unsafe executable computing components; and replacing at least one of said one or more unsafe executable computing components with a trusted version obtained from a trusted device.

8. The device of claim 1, wherein one or more safe executable computing components are initiated in said one or more safe virtual computing machines and are operable to effectively communicate with one or more other safe devices in order to manage said device by performing one of more management operations.

9. The device of claim 1, wherein said device is further operable to perform and/or attempt to perform one or more of the following:
    recover a safe version of said at least one virtual computing machine and/or one or more executable components using one or more error recovery techniques; and
    obtain a safe version of said at least one virtual computing machine and/or said one or more executable components from an external source.

10. The device of claim 1, wherein said trusted platform module and/or includes one or more of the following:
    a Trusted Platform Module (TPM), a Mobile Trusted platform Module (MTM), a Trusted Platform Module (TPM) provided as a Core Root of Trust Measurement (CRTM), a Mobile Trusted platform Module (MTM) provided as a Core Root of Trust Measurement (CRTM).

11. A method for providing one or more safe executable components in a safe computing environment, said method comprising:
    initiating a trusted platform module to begin a sequence of verifications and initiations to operate agents responsible for protecting a device from safety and security risks from within a secure virtual machine environment;
    (a) subsequent to the initiation of the trusted platform module, verifying integrity of a virtual machine monitor using a boot loader verified by the trusted platform module before allowing said virtual machine monitor to be initiated as a safe virtual machine monitor; and
    (b) initiating said virtual machine monitor as a safe virtual machine monitor when said verifying (a) successfully verifies said integrity of said virtual machine monitor, wherein said safe virtual machine monitor is operable to effectively isolate and/or guard at least one virtual computing environment from one or more unsafe virtual computing environments;
    (c) verifying integrity of at least one virtual computing environment subsequent to the initiation of said virtual machine monitor;
    (d) initiating said at least one virtual computing environment as a safe virtual computing environment when said verifying (c) successfully verifies said integrity of said least one virtual computing environment;
    (e) verifying integrity of one or more executable computing components for execution in said safe virtual computing environment when said verifying (c) successfully verifies said integrity of said least one virtual computing environment; and
    (f) initiating said one or more executable computing components as one or more safe agents in said safe virtual computing environment when said verifying (e) successfully verifies said integrity of said one or more executable computing components, wherein said one or more safe agents are effectively isolated and/or guarded from said one or more unsafe virtual computing environments by said safe computing isolating/guarding component;
    wherein at least one safe agent in the safe virtual computing environment is operable to perform a management function to protect the unsafe virtual computing environment from at least one security or safety risk, the at least one safe agent being effectively isolated and/or guarded from said unsafe virtual computing environment.

12. A method as recited in claim 11, wherein said method further comprises one or more of the following:
    monitoring by said safe executable computing components (a) one or more virtual computing environments that are not known or not believed to be safe and/or (b) one or more other executable computing components that are not known or not believed to be safe;
    attempt to recover and/or recover a safe version of said at least one virtual computing environment and/or said one or more other executable computing components using one or more error recovery techniques;
    attempt to recover and/or recover a correct version of at least one virtual computing environment and/or one or more other executable computing components that are not known or not believed to be safe using one or more error recovery techniques;
    attempt to install and/or install at least one virtual computing environment and/or one or more executable components; and
    attempt to configure and/or configure at least one virtual computing environment and/or one or more executable components.

13. A device, wherein said device is operable to:
    (a) verify integrity of computer program code for a virtual machine monitor using a boot loader verified by a trusted platform monitor before allowing said virtual machine monitor to be effectively initiated on said device;
    allow execution of said virtual machine monitor on said device as a trusted virtual machine monitor only when said verifying (a) successfully verifies said integrity of said computer program code for said virtual machine monitor;
    (b) verify integrity of computer program code for a first virtual machine only when said verifying (a) successfully verifies said integrity of said computer program code for said virtual machine monitor;
    allow execution of said computer program code for said first virtual machine on said device as a trusted virtual machine only when verifying successfully verifies said integrity of said first virtual machine;
    (c) verify integrity of computer program code for one or more executable computing components for execution in said trusted virtual machine; and
    allow execution of said computer program code for said one or more executable computing components as one or more trusted executable computing components in said trusted virtual machine only when said verifying (c) successfully verifies said integrity of said one or more executable computing components;
    wherein at least one of the trusted executable computing components acts as an agent in a safe virtual computing environment that is operable to perform a management function to protect an unsafe virtual computing environment on the device from at least one security or safety risk.

14. The device of claim 13,
    wherein said device is further operable to initiate a first trusted component which is operable to verify integrity of a computer program code for a boot loader component for starting an operating system for said device; and
    wherein said boot loader component is operable to verify said integrity of said computer program code for said virtual machine monitor before allowing said virtual machine monitor to be initiated on said device.

15. The device of claim 14, wherein said mobile device is a mobile phone.

16. The device of claim 13, wherein said trusted virtual monitor is operable to verify said integrity of said computer code for said virtual machine and/or said one or more executable computing components.

17. The device of claim 13, wherein said one or more trusted executable computing components include a trusted monitoring component operable to: monitor one or more other executable computing components which are not trusted and/or monitor one or more other virtual machines which are not trusted.

18. The device of claim 17, wherein said one or more trusted executable computing components include a trusted unauthorized use detection component operable to detect unauthorized use of said device based on monitoring performed by said trusted monitoring component.

19. The device of claim 18, wherein said trusted detection of unauthorized use includes detecting one or more of the following: Malicious Software (Malware), a worm, and a virus.

20. The device of claim 18, wherein said trusted unauthorized use detection component is further operable to detect unauthorized use of said device by one or more applications, tasks and/or services that are not trusted based on one or more of the following: (a) pattern of use of one or more applications, tasks and/or services, (b) network traffic associated with one or more applications, tasks, and/or services, (c) communication with an external source, (d) management policies and/or rules, events associated with one or more applications, tasks, and/or services.

21. The device of claim 13, wherein said one or more trusted executable computing components include a trusted error recovery/correction component operable to perform one or more of the following:
attempt to recover and/or recover computer program code that has been maliciously and/or accidently corrupted;
attempt to obtain and/or obtain a correct version of computer program code that has been maliciously and/or accidently corrupted;
attempt to obtain and/or obtain from a trusted source a trusted version of computer program code that has been maliciously and/or accidently corrupted; and
attempt to replace and/or replace computer program code that has been maliciously and/or accidently corrupted with a correct version of said computer program code.

22. The device of claim 13, wherein said one or more trusted executable components include one or more of the following:
a trusted policy management component operable to effectively provide and/or enforce policy rules and/or regulations for said device;
a trusted policy management component operable to effectively serve as an agent of a trusted server for enforcing policies, rules and/or regulations;
a trusted configuration component operable to configure one or more of the following: one or more applications, tasks and/or services, one or more operating systems, one or more computing environments for execution of said device, one or more virtual machines, and one or more interfaces;
a trusted configuration component operable to effectively serve as an agent of a trusted server for configuring said device in accordance with configurations effectively provided by a trusted server;
a trusted management component operable to effectively communicate with a trusted server and serve as an agent of said trusted server for managing said device in accordance with rules, regulations and/or management policies of a trusted server; and
a trusted security component operable to communicate with a trusted server and effectively serve as an agent of said trusted server for enforcing security on said device in accordance with rules, regulations and/or security policies of said trusted server.

23. The device of claim 13, wherein said one or more executable computing components include one or more application programs and/or tasks.

24. The device of claim 13, wherein said device is a mobile device.

* * * * *